US006928433B2

(12) United States Patent
Goodman et al.

(10) Patent No.: US 6,928,433 B2
(45) Date of Patent: Aug. 9, 2005

(54) AUTOMATIC HIERARCHICAL CATEGORIZATION OF MUSIC BY METADATA

(75) Inventors: Ron Goodman, Santa Cruz, CA (US); Howard N. Egan, Capitola, CA (US)

(73) Assignee: Creative Technology LTD, Singapore (SG)

( * ) Notice: Subject to any disclaimer, the term of this patent is extended or adjusted under 35 U.S.C. 154(b) by 323 days.

(21) Appl. No.: 09/755,723

(22) Filed: Jan. 5, 2001

(65) Prior Publication Data

US 2002/0147728 A1 Oct. 10, 2002

(51) Int. Cl.⁷ .............................................. G06F 17/30
(52) U.S. Cl. .............................. 707/4; 707/3; 707/102; 386/46
(58) Field of Search .......................... 84/609, 601, 602, 84/611–614; 707/104.1, 3, 4, 102; 386/46

(56) References Cited

U.S. PATENT DOCUMENTS

| | | | | |
|---|---|---|---|---|
| 5,616,876 A | * | 4/1997 | Cluts ............................ | 84/609 |
| 5,670,730 A | * | 9/1997 | Grewe et al. .................. | 84/609 |
| 5,918,303 A | * | 6/1999 | Yamaura et al. ............... | 84/609 |
| 5,969,283 A | * | 10/1999 | Looney et al. ................. | 84/609 |
| 6,062,868 A | * | 5/2000 | Toriumi ................... | 434/307 A |
| 6,248,946 B1 | * | 6/2001 | Dwek ........................... | 84/609 |
| 6,377,530 B1 | | 4/2002 | Burrows | |
| 2003/0016940 A1 | * | 1/2003 | Robbins ....................... | 386/46 |

OTHER PUBLICATIONS

Web page, Menta, Richard, "1200 Song MP3 Portable is a Milestone Player," MP3 newswire.net, Jan. 11, 2000, 5 pages, http://pjbox.com/newswire/.
Web page on "MusicMatch Jukebox 4.0: Screen Shot 1," PC Magazine, Jun. 17, 1999, 2 pages, http://web.archive.org/web20000226113655/www.zdnet.com/products/stories/reviews/0,4161,2277814,00.html.
Web page, Norton, Patrick, "MusicMatch Jukebox 4.1, the Ultimate MP3 Utility," techtv, Sep. 17, 1999, 2 pages, http://www.techtv.com/freshgear/print/0,23102,2324631,00.html.
Web page on "Can you carry your CD collection in your pocket? Yes, you can." Compaq web site, 3 pages, http://research.compaq.com/SRC/pjb/, Printed on Apr. 30, 2004.

* cited by examiner

*Primary Examiner*—Charles Rones
(74) *Attorney, Agent, or Firm*—Russell N. Swerdon; Creative Technology LTD

(57) ABSTRACT

A method, performed by software executing on the processor of a portable music playback device, that automatically files tracks according to hierarchical structure of categories to organize tracks in a logical order. A user interface is utilized to change the hierarchy, view track names, and select tracks for playback or other operations.

16 Claims, 12 Drawing Sheets

For example:
    Category 1 = Album Name
        Category Value 1 = Abbey Road
        Category Value 2 = Hits from the 60's Category 2 = Artist Name
        Subcategory Value 1 = British Artists
        Subcategory Value 2 = American Artists
        Category Value 1 = The Beatles
        Category Value 2 = Petula Clark
        Category Value 3 = Mamas and the Papas
        Category Value 4 = Nick Drake Category 3 = All tracks V1.0
Albums|0x01|BLBN
Artists|0x01|BCBMBN
All Tracks|0x01|BN

| file data | album | name | genre | type |
|---|---|---|---|---|

| Albums | | | |
|---|---|---|---|
| | Full Moon Fever | Free Falling | |
| | | I Won't Back Down | |
| | | Love Is A Long Road | |
| | Graceland | The Boy In The Bubble | |
| | | Graceland | |
| | Hotel California | Hotel California | |
| | | New Kid In Town | |
| | Unknown (Created for items without Album attribute) | Track 1 | |
| | | Stardust | |
| Artist | | | |
| | Tom Petty | Full Moon Fever | Free Falling |
| | | | I Won't Back Down |
| | | | Love Is A Long Road |
| | Eagles | Hotel California | Hotel California |
| | | | New Kid In Town |
| | Paul Simon | Graceland | The Boy In The Bubble |
| | | | Graceland |
| Genre | | | |
| | Rock | Full Moon Fever | Free Falling |
| | | | I Won't Back Down |
| | | | Love Is A Long Road |
| | | Hotel California | Hotel California |
| | | | New Kid In Town |
| | | Graceland | The Boy In The Bubble |
| | | | Graceland |

*FIG. 7.*

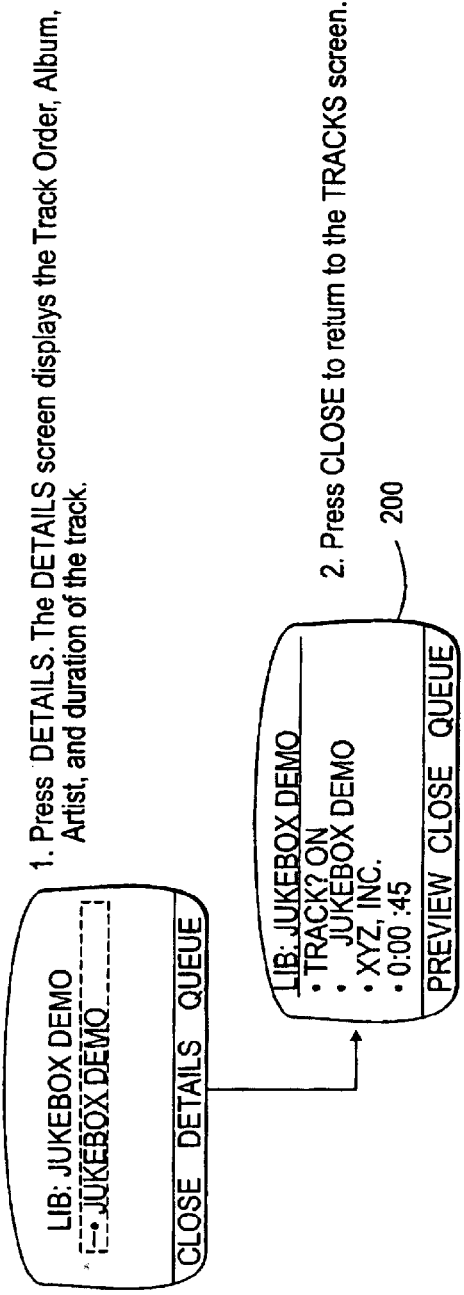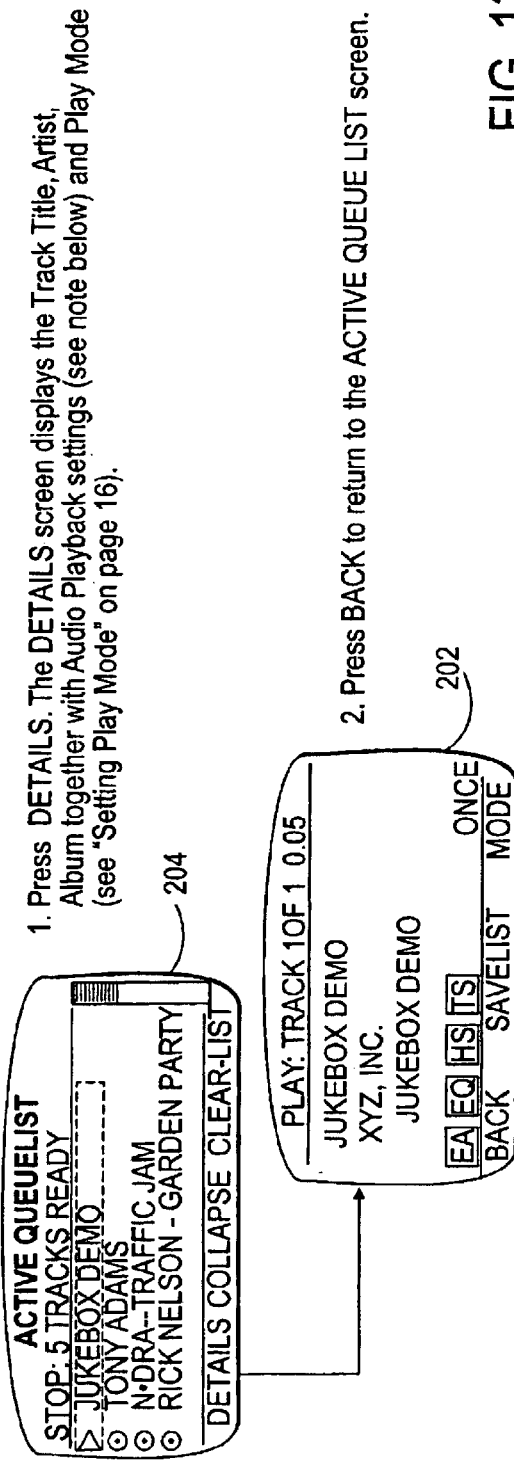
FIG. 13

AUTOMATIC HIERARCHICAL CATEGORIZATION OF MUSIC BY METADATA

CROSS-REFERENCES TO RELATED APPLICATIONS

This application is related to Application Ser. No. 09/755,629, entitled "System for Selecting and Playing Songs in a Playback Device with a Limited User Interface," now abandoned and Application Ser. No. 09/755,367, entitled "Audioplayback Device with Power Savings Storage Access Mode," issued as U.S. Pat. No. 6,590,730, all filed Jan. 5, 2001, the disclosures of which are incorporated herein by reference.

BACKGROUND OF THE INVENTION

Today, portable consumer electronic devices are more powerful than ever. For example, small, portable music playback devices can store hundreds, even thousands, of compressed songs and can play back the songs at high quality. With the capacity for so many songs, a playback device can store many songs from different albums, artists, styles of music, etc.

Music jukeboxes implemented in software executed by a digital computer and portable MP3 and CD players both provide facilities for forming playlists. For example, the OOZIC player, distributed by the assignee of the present application, runs on a host PC and has a playlist feature that allows selection of tracks from the PC's hard disk to be included in the playlist.

As storage capacity increases and songs are compressed to shorter file lengths the number of songs that can be stored increases rapidly. Major problems facing the consumer are organizing and accessing the tracks.

Typically, portable devices have a user interface including a small screen and buttons. Such a display screen might be, e.g., 1"×2". This small display size is necessary because of the physical size of the device which is typically carried in the hand. The small size also limits the number, size, shape, and types of user input controls that can be mounted on the device. For example, a few pushbuttons are usually provided to perform all of the device's control functions. Using such a compact user interface to navigate and select among hundreds of songs is inefficient and often frustrating. The display screen can only show a few song titles at one time, and the limited controls make it difficult for a user to arbitrarily select, or move among, the songs.

The creation of playlists is one technique to organize the playing of songs. A set of songs can be included in a playlist which is given a name and stored. When the playlist is accessed, the set of songs can be played utilizing various formats such as sequential play or shuffle.

However, the creation of playlists itself becomes problematic as the number of songs increases, since the user often arbitrarily selects songs from a large number of tracks to form a playlist. This selection mechanism: can be fairly tedious; does not necessarily produce playlists that are of interest to the user over the course of time; may not remain up-to-date if new songs are added that logically fit into a previously created playlist (e.g. "Favorites by Band X" might become out of date if a new favorite by Band X is added after the playlist was created); and leads to "lost" songs that are not members of any playlist.

Accordingly, improved techniques for organizing and grouping tracks useful in a portable music player are needed.

Further, it is desirable to provide a user interface suitable for a small device. The user interface should allow a user to efficiently navigate among, and select from, many items stored in the device.

SUMMARY OF THE INVENTION

The present invention provides an efficient user interface for a small portable music player. The invention is suitable for use with a limited display area and small number of controls to allow a user to efficiently and intuitively navigate among, and select, songs to be played. By using the invention, very large numbers of songs can be easily accessed and played.

One aspect of the invention includes an overlapping hierarchy of categories. Categories include items that can also be included in other categories so that the categories "overlap" with each other. Thus, a song title can be accessed in multiple different ways by starting with different categories. For example, a preferred embodiment of the invention uses the top-level categories "Albums", "Artists", "Genres" (or styles), and "Play Lists". Within the Albums category are names of different albums of songs stored in the device. Within each album are the album tracks, or songs, associated with that album. Similarly, the Artists category includes names of artists which are, in turn, associated with their albums and songs. The Genre category includes types of categories of music such as "Rock", "Hip Hop", "Rap", "Easy Listening", etc. Within these sub-categories are found associated songs. Finally, the "Play Lists" category includes collections of albums and/or songs which are typically defined by the user.

Advantageous use is made of the overlapping hierarchy to allow the user to quickly designate a song for playback. The device uses three "soft" pushbuttons that have assignable functions. The interface maintains consistent button functionality whenever possible and uses uniform command names and operations in different types of items so that the interface is more intuitive. For example, the user can open and queue both albums and songs with predictable results.

The interface also provides for multiple functions for a single control. For example, a "Play" button can act, in a first function, to play a currently-selected song. The Play button can act, in a second function, to cycle through different playback modes. The modes can be, e.g., (1) playback of songs from a hard disk; (2) playback of music from a radio receiver built into the device; and (3) playback of voice messages. The first function for the Play button can be activated by momentarily depressing the Play button for a short period of time. The second function is invoked by depressing the Play button for a longer period of time whereupon the device cycles through the different modes. Other ways of invoking the functions are possible such as where the second function is automatically entered from a powered-down state.

In one embodiment, the invention provides a method for selecting songs to be played in an electronic audio device, wherein the device includes a display and one or more user input controls, wherein songs are organized into categories, albums, wherein songs and albums are associated with artist names. The method includes steps of displaying categories on the display; accepting signals from a user input control to select a category; displaying one or more songs in the selected category on the display; accepting signals from a user input control to select a displayed song; and entering selected songs into a playlist queue, wherein the device plays back songs in the playlist queue.

According to one aspect of the present invention, a technique is provided for organizing tracks on a portable music player by automatically filing tracks in a hierarchical order based on attributes of the tracks.

According to another aspect of the invention, metadata is associated with each track that is used to automatically define the track's appropriate place in the hierarchy.

According to another aspect of the invention, the hierarchy is displayed on the portable music player so that a user can traverse the organizational hierarchy to find individual tracks or find playlists composed of logical groups of tracks.

According to another aspect of the invention, the hierarchy is derived by using metadata associated with the audio content that was obtained through any source of metadata (e.g. CDDB metadata, id3v2 metadata, other obtainable metadata) and subsequently stored with or alongside the file that stores the track.

According to another aspect of the invention, a file is formatted so that an unaltered track is stored as file data and information about the track is stored in file attribute files.

Other features and advantages of the invention will be apparent in view of the following detailed description and appended drawings.

BRIEF DESCRIPTION OF THE DRAWINGS

FIG. 7 depicts a tree resulting from searching the tracks; and

FIG. 13 illustrates details of different items; and

DETAILED DESCRIPTION OF THE PREFERRED EMBODIMENTS

Figure 1:
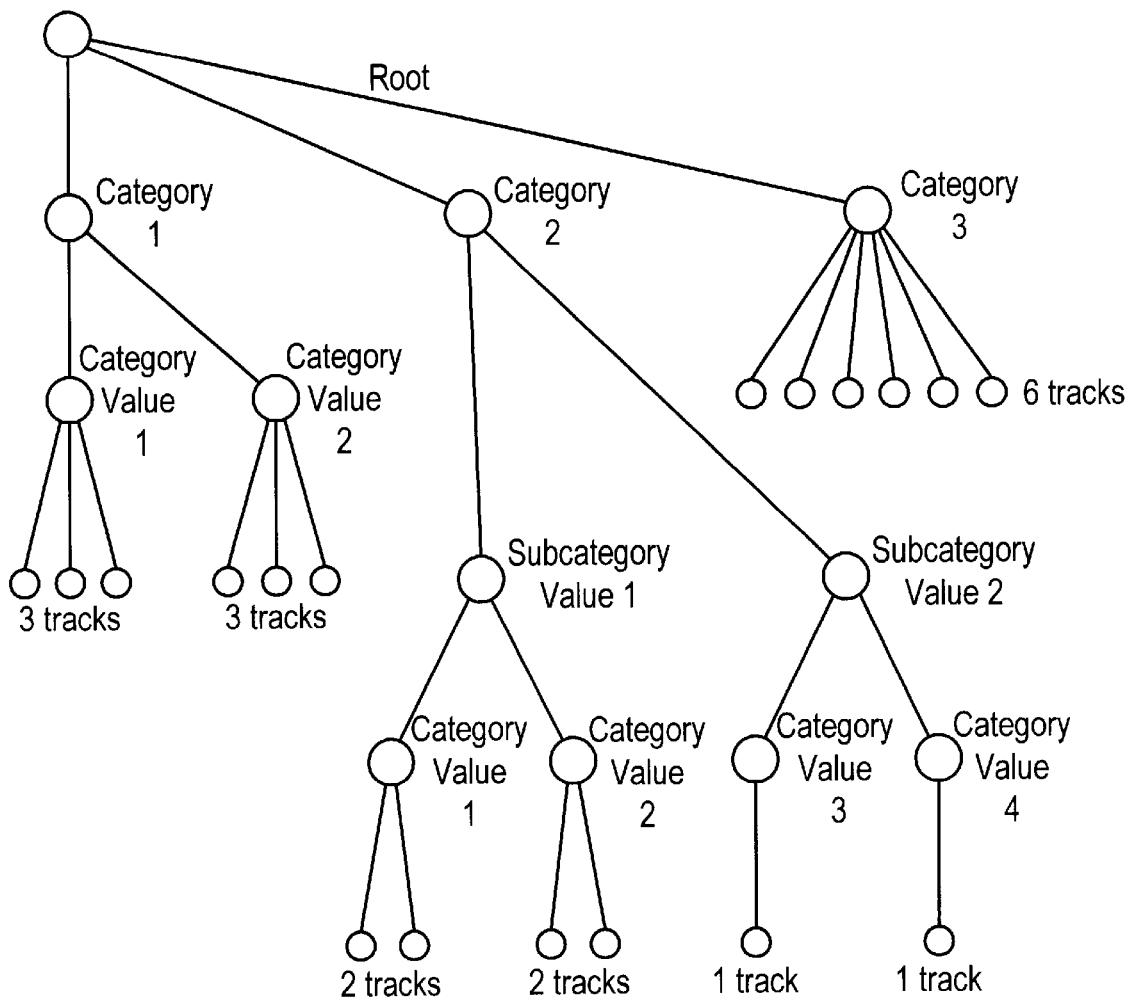
FIG. 1 is a schematic diagram of a tree structure for hierarchical filing of tracks.

A preferred embodiment of the invention will now be described in the context of a portable personal player that plays audio files stored in memory. The files may be in MP3, wav. or other digital formats.

In the presently described embodiment, users are able to see the tracks on their player in some organized fashion other than as a single list of tracks. As will be described in more detail below, in one embodiment tracks are sorted utilizing a tree structure having branches labeled according to types of metadata associated with the tracks For example, a track recorded as "Golden Slumbers" by the Beatles that appears on their album "Hey Jude" might appear as a track under the album "Abbey Road" as well as a track under the list of tracks by the Beatles. It might appear as a track under the genre "Pop Rock" as well as "Songs from the 60's." Furthermore, the organization can have more complex hierarchies. For example, the category of "Pop Rock" might contain subcategories "British Musicians," "American Musicians" and "Other Musicians". In all cases, the track is automatically filed into all appropriate locations without requiring user interaction.

In the currently defined embodiment, a tree structure is defined by a file having the following structure.

The first line of a TreeDef.inf file contains a version number:

V1.0

Each subsequent line (at least in v1.0) contains lines of the following format:

CATEGORY_NAME|TRACK_TYPE MASK|CATEGORY_STRUCTURE

CATEGORY_NAMEs are the top-level names of the branch under which tracks are sorted. They include things like "Album," "Artist," "Voice Tracks," "All Tracks," etc.

TRACK_TYPE_MASKs tell which types of tracks are to be filed under this particular branch. The actual value is a hexadecimal numerical value (in '0X' format, e.g. 0X01) generated by ORing the following flags together as appropriate:

```
enum tTrackType
{
    kTTNothing=0x00,
    kTTSong=0x01,
    kTTVoice=0x02,
    kTTBook=0x04,
    kTTMacro=0x08,
    kTTPlaylist=0x10
};
```

So, for example, the "Album" branch has a TRACK_TYPE_MASK of kTTSong, because only songs are filed under that branch, but the "All Tracks" branch has a TRACK_TYPE_MASK of (kTTSong|kTTVoice|kTTBook).

Other elements might be added to tTrackType (e.g. kTTVideo) as appropriate.

CATEGORY_STRUCTUREs tell how to file the songs based on their metadata information. The CATEGORY_STRUCTURE is a string of characters that tell, from left to right, the order of hierarchy. The characters come from the following enum constants:

```
enum tFileTag
{
    kFTNone='@',
    kFTTrackType='T',
    kFTTitle='N',
    kFTAudioFile='F',
    kFTArtist='M',
    kFTAlbum='L',
    kFTGenre='G',
    kFTSource='S',
    kFTYear='Y',
    kFTArtistCountry='C'
};
```

Thus, a CATEGORY_STRUCTURE of LN tells to create a subcategory that is a list of Albums, each of which contains a list of Tracks.

In total, a line like:
Album|0x01|LN
Says to create a branch called "Album" which contains tracks of type kTTSong organized first by album name, and then by track name.

The following is an example of a tree definition file similar (though not identical) to the hierarchy presented in the Nomad Jukebox product (the 'B' before each FileTag was used to identify that these are basic tags so that we wouldn't run out of letters in the alphabet as we included more complex metadata—thus each group of two letters represents a level in the hierarchy):

```
V1.0
Album|0x01|BLBN
Artist|0x01|BMBN
Genre|0x01|BGBN
Voice Tracks|0x02|BSBGBN
Playlists|0x10|BN
Macros|0x08|BN
All Tracks|0x07|BN
```

FIG. 1 depicts a hypothetical organization hierarchy. The tree shows how tracks might be listed (as leaves in the tree) after having been organized. Example values for nodes in the tree are shown as well. The same track may appear more than once as a leaf in the tree, as described above, if it fits into multiple categories (e.g. a song that appears on the Abbey Road branch would also appear in the Beatles branch). In the example shown, the first branch contains tracks organized by album. As shown in the example, this music collection contains three tracks from "Abbey Road" and three tracks from "Hits from the 60's". The second branch contains tracks organized by artist, and sub organized by where the artist is from. Thus, a user browsing would first select the "Artists" branch and then choose between "British Artists" and "American Artists". Finally, they would select the particular artist. In the third branch, all tracks are shown.

Figures 2, 3:
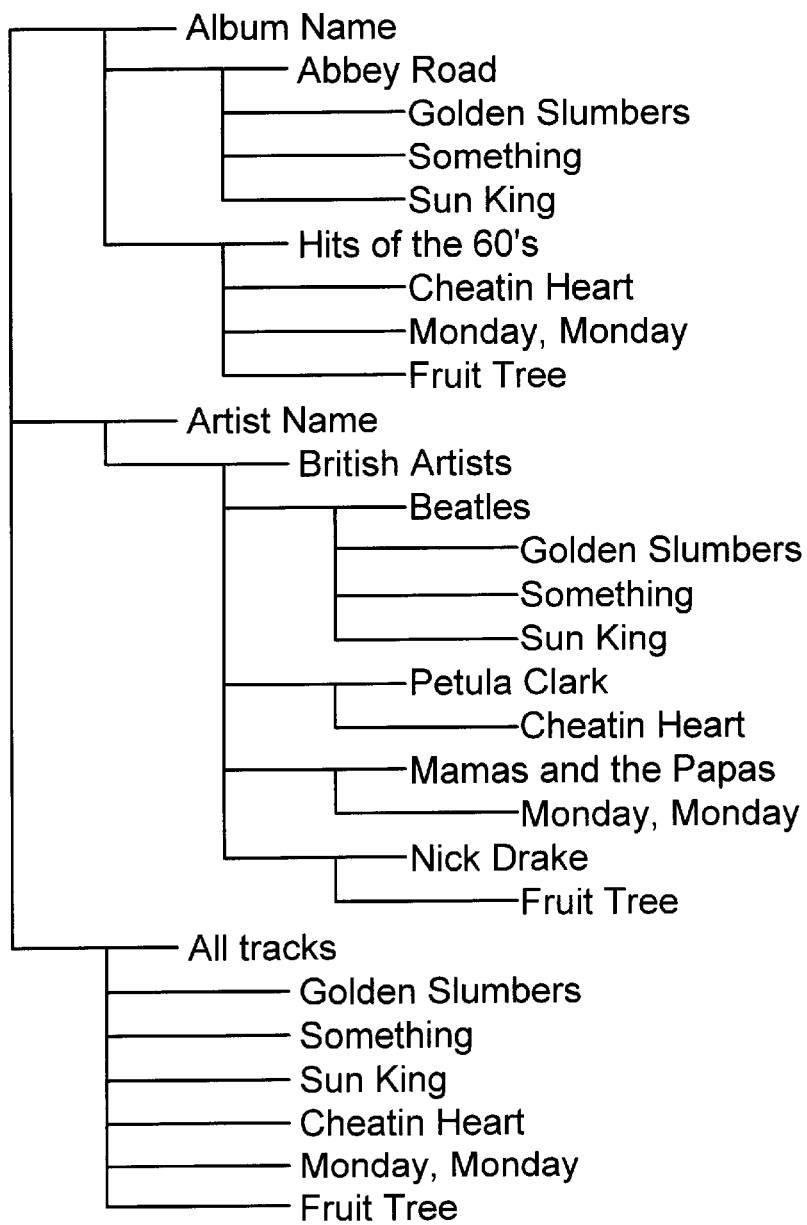
FIG. 2 is a definition file that specifies the hierarchy depicted in FIG. 1.
FIG. 3 is a user's view of the hierarchy.

The tree definition file that would specify the hierarchy shown in FIG. 1 is shown in FIG. 2.

The first line identifies the version of the tree definition file.

The second line defines the "Albums" branch. The first part of the line, "Albums" defines the name of the branch. The second part, "0x01," defines that all musical tracks should be categorized on this branch. The third part, "BLBN," defines that the branch lists first the names of all albums (BL) and then tracks on those albums (BN).

The third line defines the "Artists" branch. The first part of the line "Artists" defines the name of the branch. The second part, "0x01, " defines that all musical tracks should be categorized on this branch. The third part, "BCBMBN," defines that the branch lists first the names of all countries where artists in this collection come from (BC) and under those items, the artists' names (BM), and then tracks by those artists (BN).

FIG. 3 shows what a user's view of this hierarchy might be if he/she were shown a fully expanded view of the 6-song tree. Notice that each song appears three times, once in each branch.

Figures 4, 5:
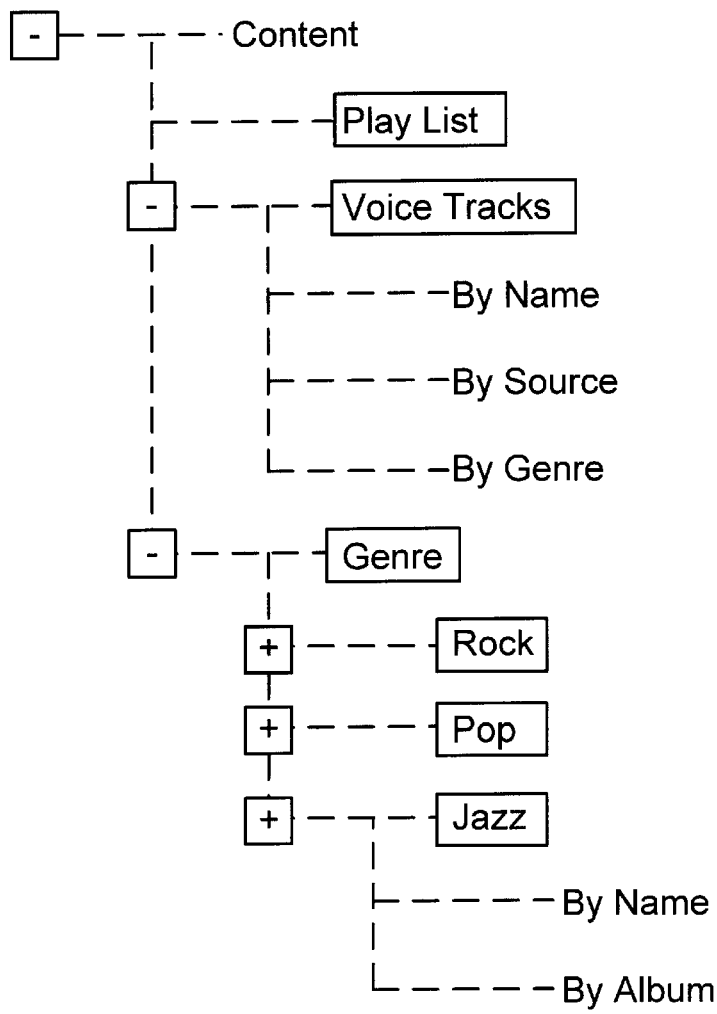
FIG. 4 is a schematic diagram of a user interface displaying the hierarchical category structure.
FIG. 5 is a diagram of a file format for storing filed data and file attributes.

In consumer products the tree define file is not edited directly but through a user interface, one example of which is depicted in FIG. 4. An example of a user interface for viewing songs by category and editing the tree structure is depicted in FIG. 4.

An embodiment of the invention is utilized in the Nomad® Jukebox, manufactured by the assignee of the present invention, and described more fully in the copending application, filed on the same date as the present application, entitled "System for Selecting and Playing Songs in a Playback Device with a Limited User Interface," (Attny. Docket No. 17002-020800).

In a preferred embodiment, metadata is associated with each track and includes such information as title, genre, artist name, type, etc. In the preferred embodiment, software stored in a portable player and executed by the onboard processor automatically files each track in the correct category utilizing the associated metadata and the tree define file. The program code can be stored in any computer readable medium including magnetic storage, CD ROM, optical media, or digital data encoded on an electromagnetic signal.

Thus, the user is automatically provided with a powerful and flexible tool for organizing and categorizing the tracks stored on the portable player.

If the tracks are formatted in MP3 format the metadata can be stored in ID3 tags included in the MP3 file. In one embodiment of the invention, the tracks are stored in alternate file format including file data and file attributes. The file data is the music track itself and the file attributes part of the file includes fields of arbitrary size which are used to store metadata characterizing the track stored as the file data. Again this metadata includes information about the track such as title, genre, artist name, type, etc.

There are several advantages to using the alternate file format. Metadata of types not easily included in an ID3 tag can be utilized. Further, the original track format is not changed, so that error correction data such as checksums are valid. Finally, any file format can be used (e.g. WAV, WMA, etc.) because the metadata is stored separately, and thus audio formats that have limited support for metadata can still be stored on the portable player in native format without transcoding. The formatted files are formed by software stored in the portable music player and executed by an on-board processor.

The metadata for each track is utilized to file each track, using the categories defined in the hierarchical structure as described above, without any input from the user.

FIG. 5 is a schematic diagram of the alternative file format including file data in the form of an MP3 track, and metadata fields for holding data indicating the name of the album the track is from, the name of the song, the genre of the song, and the type of track.

A particular embodiment of a file format will now be described. All tracks are created with some set of attributes as shown below:

| Definition of TrackInfo Data Field | | | |
|---|---|---|---|
| Field | Offset | Size | Description |
| Attribute Count | 0 | 2 | The number of attribute follow for the track |
| Attr 1 type | 2 | 2 | Binary = 0, ASCII = 1 |
| Attr 1 name len | 4 | 2 | Length of attribute name string |
| Attr1 data len | 6 | 4 | Length of attribute data |
| Attr1 Name | 10 | N | Attribute name string |
| Attr 1 Data | 10 + N | M | Attribute data |
| ... | | | |
| ... | | | |
| Attr N type | | | |
| Attr 1 name len | | | |
| Attr1 data len | | | |
| Attr1 Name | | | |
| Attr 1 Data | | | |

-continued

Required Attributes

| Attribute Name | Value(s) | Remarks |
| --- | --- | --- |
| TITLE | ASCII string | RequiredByJukebox |
| CODEC | "MP3", "WMA", "WAV" | RequiredByJukebox |
| TRACK ID | DWORD | Set By Jukebox |
| ALBUM | ASCII string | Optional |
| ARTIST | ASCII string | Optional |
| GENRE | ASCII string | Optional |
| LENGTH | In seconds | Optional |
| TRACK SIZE | In bytes | Optional |
| TRACK NUM | 1-n (track within album) | Optional |

These attributes can be subsequently changeable via a host application, running on a personal computer connected to the portable music player.

Figure 6:
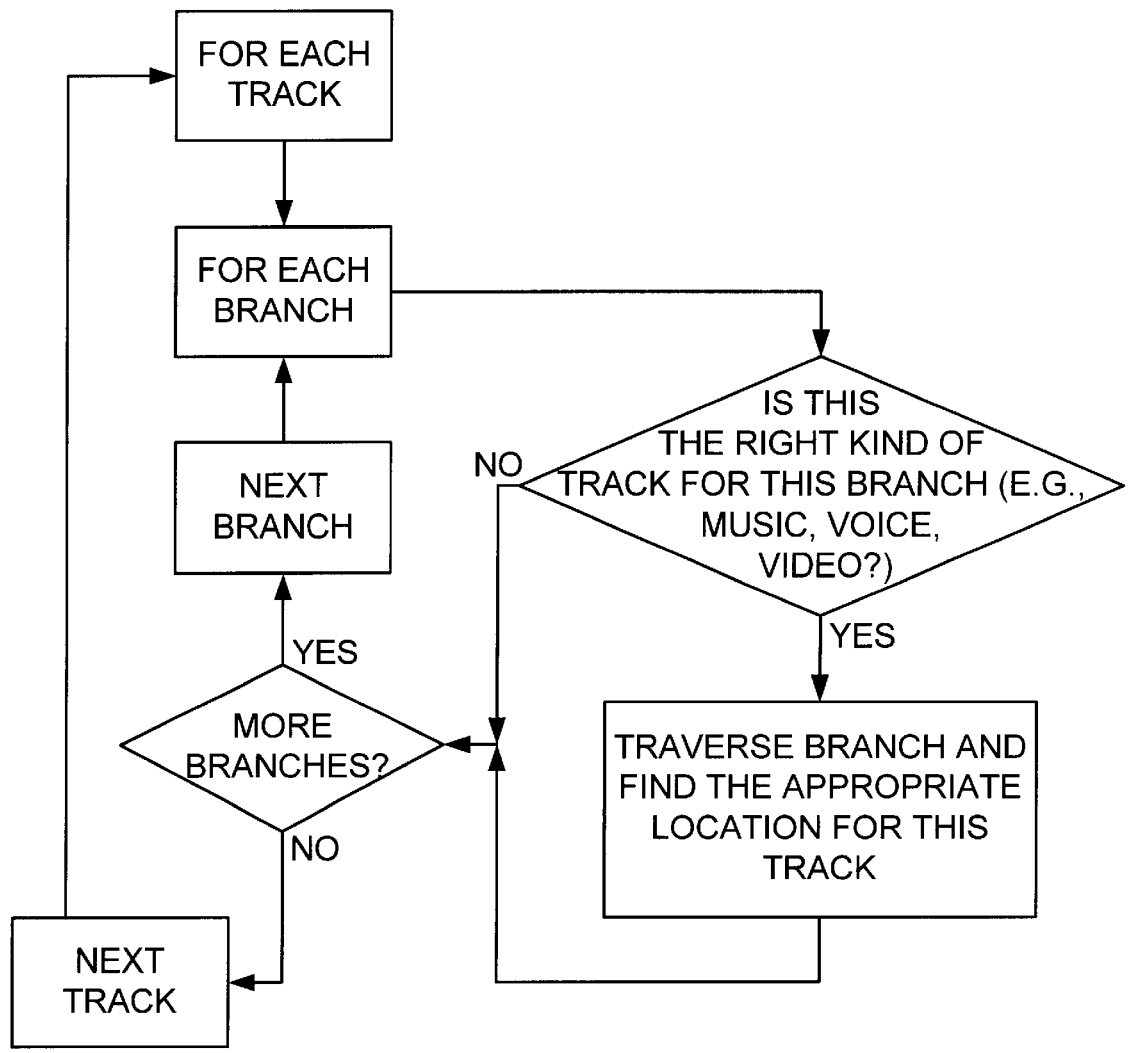
FIG. 6 is a flow chart depicting steps for filing tracks according to the hierarchical tree structure.

FIG. 6 shows a flow chart of an embodiment the process used to build the hierarchical database of tracks. It starts by iterating through each track, and, for each track, iterating through each branch to find if the track belongs on the branch, and, if so, where. In this case, the term track could refer to any content, e.g. a music track, a spoken word track, or even a video track.

Also, the hierarchical catalog of tracks can be used to form playlists in a structured manner. For example, if a user wants to hear Jazz and Blues the entire sub-categories can be selected to form one playlist.

An alternative hierarchical catalog generation technique will now be described. In this alternative embodiment, at system startup and as tracks are added or changed, the hierarchy is generated as an in-memory tree structure. Each track is added to the tree using the categories ALBUM, ARTIST and GENRE.

The following example shows the algorithm for adding a track. For clarity, only the attributes used by the tree are shown.

| | |
| --- | --- |
| TITLE | "Free Falling" |
| ALBUM | "Full Moon Fever" |
| ARTIST | "Tom Petty" |
| GENRE | "Rock" |
| TRACK NUM | 1 |

The following function is executed to build the in-memory memory tree.

```
Build Tree( )
For each track,
    Add Track To Category(Album, Track)
    Add Track To Category(Artist, Track)
    Add Track To Category(Genre,Track)
End of Build Tree
```

FIG. 7 depicts a tree which could result from implementing Build Tree( ) function. Note that "Stardust" does not have any entries for Album or Artist. The host software running on a computer connected to the portable music player could be utilized to add missing attributes to the "Stardust" track and, optionally, edit the title attribute. The Build Tree( ) function would then reinsert this track in the correct location in the tree.

Figure 8:
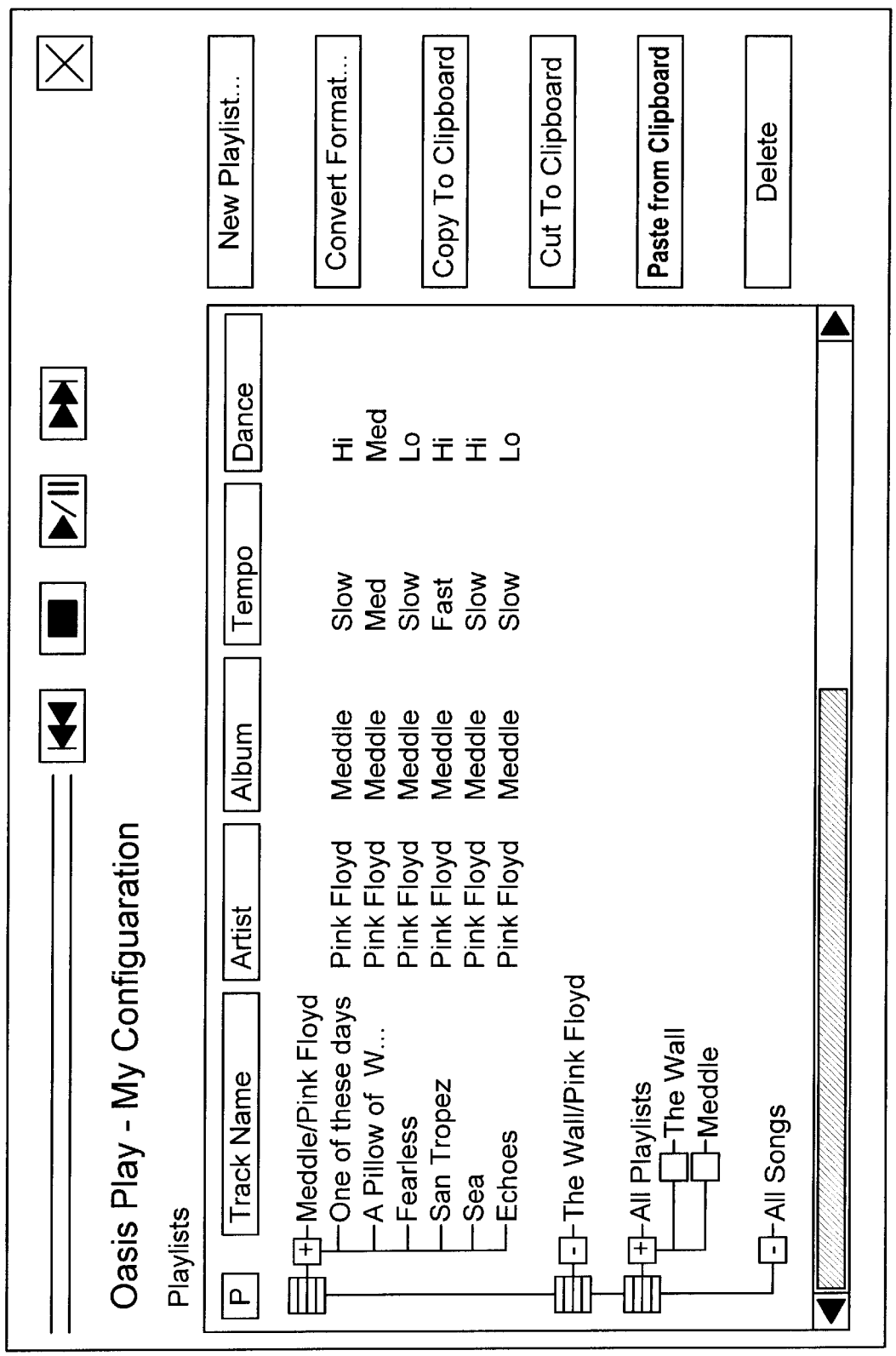
FIG. 8 depicts a format for a user interface.

FIG. 8 is an embodiment of a user interface according to another embodiment of the invention. In this example the root node is labeled "My Configuration" and the Playlist category has been selected and the Playlist subcategory "Meddle" has been selected. Note that the types of Metadata, in this example, Track Name, Artist, Album, Tempo and Dance, are listed across the top of the screen, and the attribute values for each track are listed in a row across the screen. Various control buttons are displayed to the right of configuration window that facilitate quickly invoking selected processing on a selected track.

As noted above, a preferred embodiment of the present invention is incorporated into a product manufactured and distributed by Creative Technology, Ltd. The product is called the "NOMAD Jukebox." The following description describes further details of the display screens and interface controls.

Figure 9:
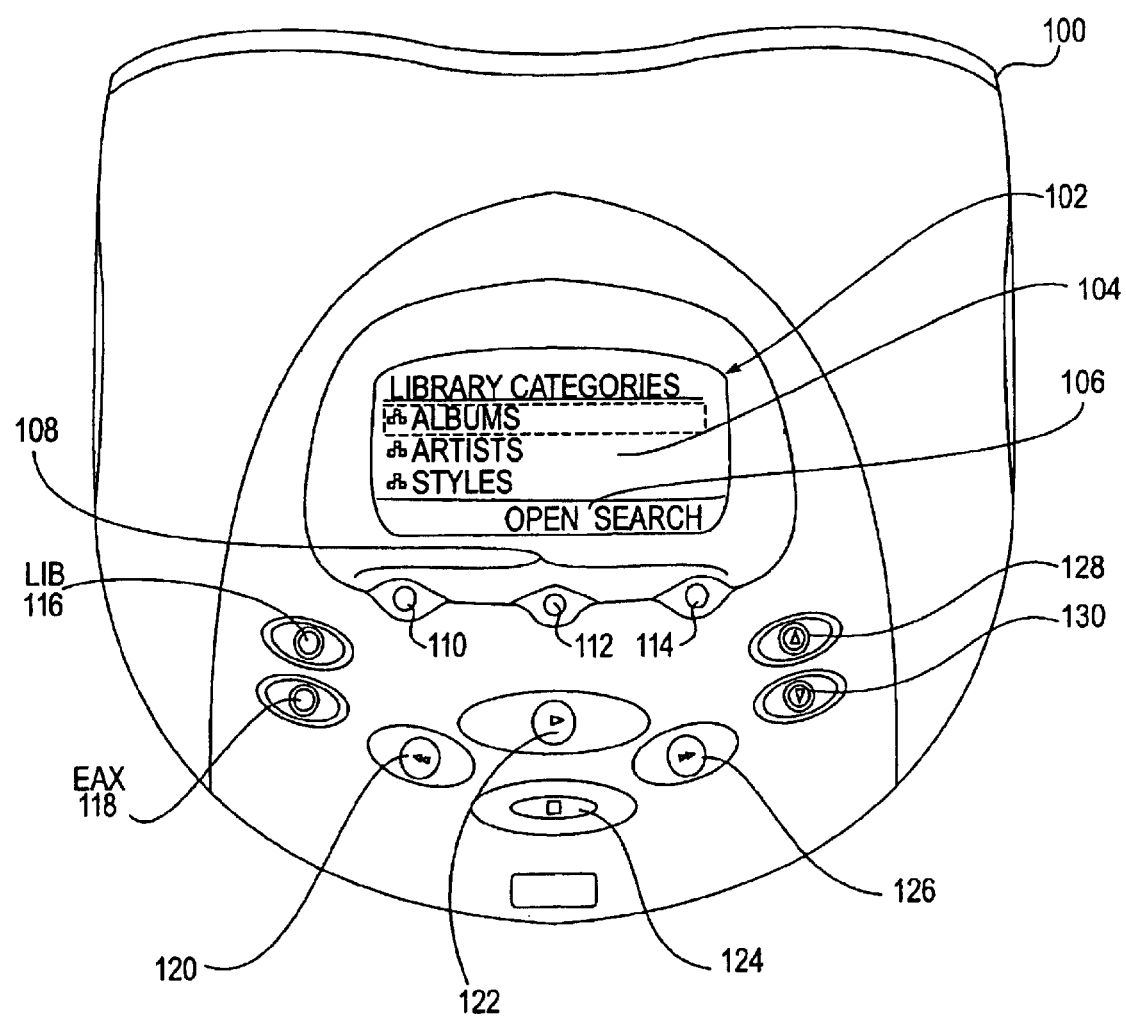
FIG. 9 illustrates the NOMAD Jukebox and its user interface controls.

FIG. 9 illustrates the NOMAD Jukebox and its user interface controls.

In FIG. 9, electronic audio device 100 measures about 5.5" wide by 5.5" tall by 1" thick. Display screen 102 is about 2" wide by 1" tall. Display screen 102 includes different regions such as main region 104 and soft button function description region 106.

Three soft buttons are located at 108; including buttons 110, 112 and 114. The specific command, or function, that any of the soft buttons perform when depressed is indicated by the label in soft button function description region 106. Thus, the function of soft button 112 (as shown in FIG. 9) is "open," the function of soft button 114 is "search" while soft button 110 is currently not assigned a function.

The other eight buttons on device 100 perform essentially the same functions at all times. In other words, they are not subject to function changes according to soft button function description area 106. These button include Library button 116, EAX and System button 118, Skip Backward button 120, Play button 122. Stop button 124, Skip Forward Button 126, Scroll Up button 128 and Scroll Down button 130. However, as discussed below, these buttons (or any type of controls used with the device) can include alternate functionality that is invoked in different ways.

The device uses visual cues, or indicators, in the display. When an item is highlighted it indicates that the item is the "current" item, or currenty-selected item, which is susceptible to be operated on by a subsequent user action—such as playback, or expansion of the item. In FIG. 1, screen 102 shows that the item, "ALBUMS," is highlighted. The highlighted item can be acted upon by using the soft buttons, or another button, as decribed below. The current item can be changed by using Scroll Up button 128 and Scroll Down button 130 to move the highlight up or down, respectively, throughout a list of displayed items.

Icons are used to provide additional visual cues for an item. In FIG. 1, each of the categories has a category icon to the left of it. The category icon, which may not be distinctly visible in the Figure, illustrates a first box connected by lines to additional boxes below the first box. The icon depicts a hierarchy and illustrates the property of categories, i.e., that categories can contain additional categories, songs or other items.

Figure 10:
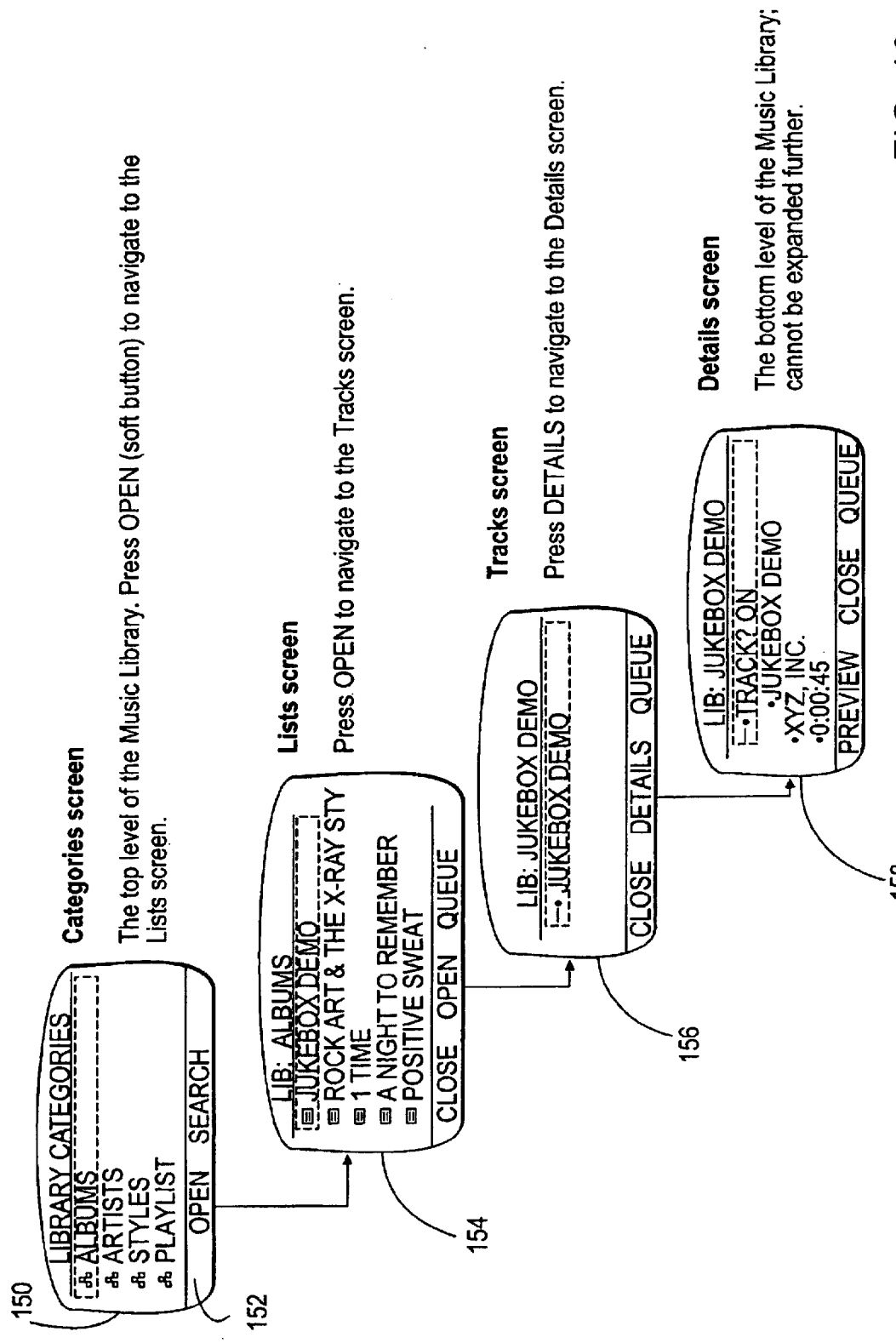
FIG. 10 illustrates a sequence of display screens describing how to navigate to lower levels.

FIG. 10 illustrates a sequence of display screens describing how to navigate to lower levels.

In FIG. 10, library category screen 150 shows the display as it appears when the user depresses library button 116 of FIG. 9. A preferred embodiment of the device uses 4 first-level categories. These are "Albums", "Artists," "Styles" and "Play Lists". Each of these categories can "contain," or be associated with, other categories, songs, or items.

Note that in library category screen 150 ALBUMS is currently highlighted. By depressing soft button 112 of FIG.

9, the "open" command is performed on the highlighted category, as indicated by the labeling of soft button 112 and soft button function description area 152 of FIG. 10.

Lists screen 154 is displayed as a result of a user opening Album category of library category screen 150. Lists screen 154 shows items within the Albums category such as commercial albums of multiple songs from a record label, pre-made lists or collections created by a user, or other predefined lists or collections of songs or recordings.

In FIG. 10, lists screen 154 shows each item as a list of songs. This is shown visually by the icon to the left of each item which depicts a miniature list. Possible soft button commands are "Close", "Open" and "Queue". These commands correspond to soft button 110, 112 and 114, respectively. If the user selects the Close command, the display reverts to library category screen 150. If the user selects the Open command, the display shows tracks screen 156. Alternatively, the user can select the Queue command to instruct the device to place all the songs from the selected (i.e., highlighted) list into the play list for eventual playback. Yet another option allows the user to press play button 122 of FIG. 9 to cause any currently-selected songs or a list of songs (e.g., an album) to immediately be played.

Returning to FIG. 10, tracks screen 156 shows that a single song called "JukeBox Demo" is in the list. The list is also called JukeBox Demo as shown in lists screen 154. Tracks screen 156 shows possible soft commands assigned to buttons, namely "Close", "Details" and "Queue." The Close button performs the same function as before—it returns the user to the previous screen which, in this case, is lists screen 154. The user can also select the Details command to cause details of the song JukeBox Demo to be displayed in details screen 158 as shown in FIG. 10. The user can select the Queue command by soft butto 114 to enter the selected song into the play list queue. As before, the user can also depress play button 122 of FIG. 9 to cause immediate playback of the selected song.

Details screen 158 shows information about the selected song including the name of the song, album (or list) name containing the song; the track number, if applicable, and track duration. Note that other information can be included. The user can preview the song, close the Details screen to return to the Tracks screen or queue the song on the play list queue.

The device provides the ability to "preview" audio files even while a current song, or playlist, is being played. When a user chooses to preview an audio file, the audio file is played for about 10 seconds while any currently-played file or playlist is suspended. After previewing is complete, the suspended file or playlist resumes playback. In other embodiment, the preview duration can vary, or be stopped by user selection.

Figure 11:
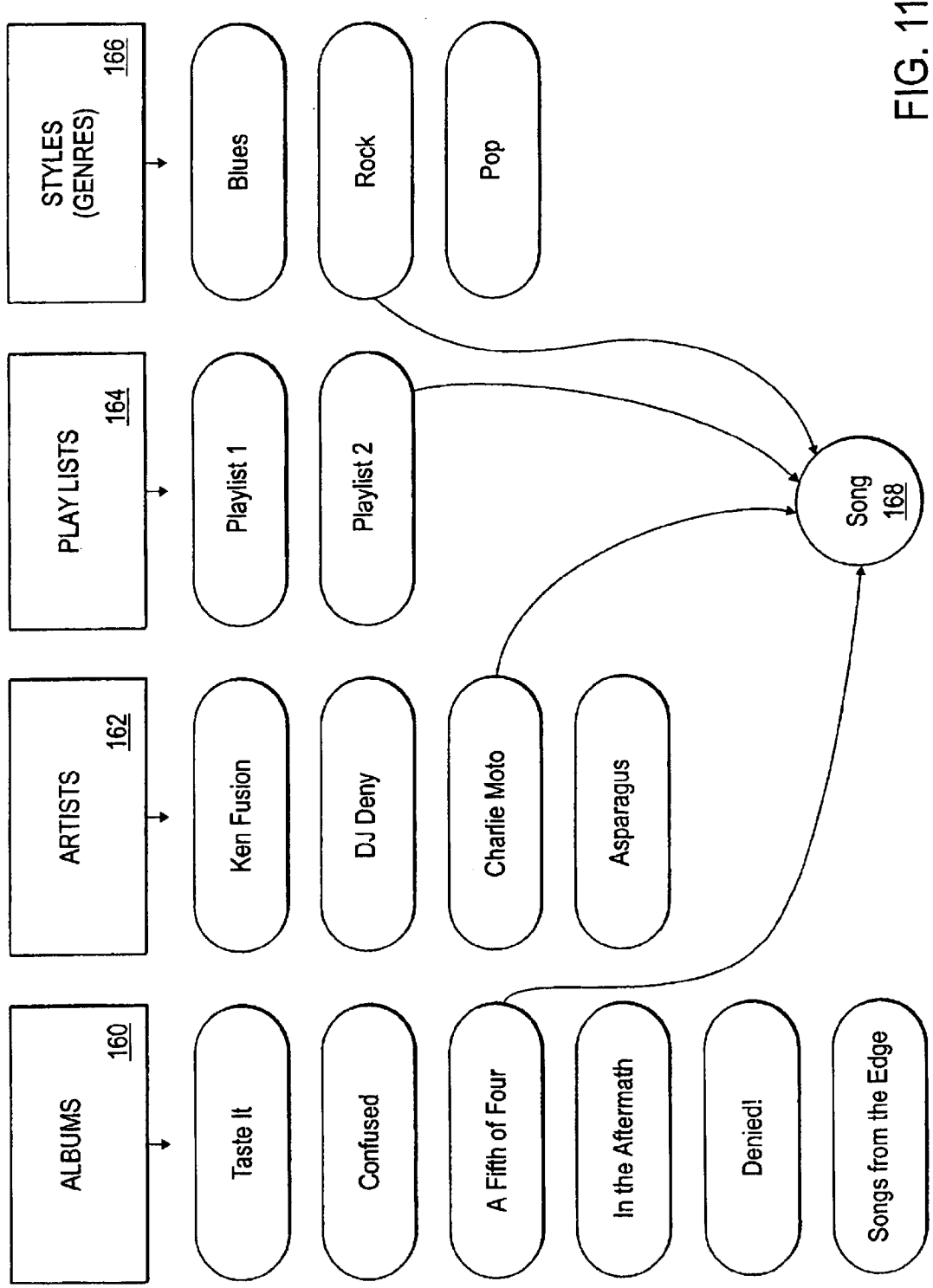
FIG. 11 illustrates associations among items.

FIG. 11 illustrates associations among items.

In FIG. 11, song 168 is one of many songs stored in the device. Categories such as albums 160, artists 162, play lists 164 and genres 166 each include sub-categories. For example, albums 160 includes the names of various albums. Songs are associated with albums, genres and playlists. Such association can be by using pointers, a data structure including items to be associated, etc. "Association" as used herein, includes a first item associated with a second item; and the second item associated with the first item. In other words, albums can be associated with one or more songs in the database of the device so that an utomated search to find all songs associated with an album is easier. The direction of arrow pointers in FIG. 11 is not intended to limit the manner of associations among items in the present invention.

Similar to albums, the category of artists 162 includes names of artists, or performers, of songs. Each artist name is associated with one or more songs in the database. Playlists 164 includes names of playlists. These are collections of songs that can be defined by the user, the device manufacturer, or others. Each playlist can be associated with one or more songs. Genres 166 includes various styles of music which are associated with one or more songs. Genres 166 includes various styles of music which are associated with one or more songs in the database. Note that items can exist without being associated with a song. Also, items can be associated with other items as where an artist name is associated with the albums containing the songs that the artist has created.

Although not shown in FIG. 11, items can have additional information, such as properties, details, etc., associated with the item. For example, a song can have information such a play time, artist name, artist album, copyright owner, etc., associated with the song.

Figure 12:
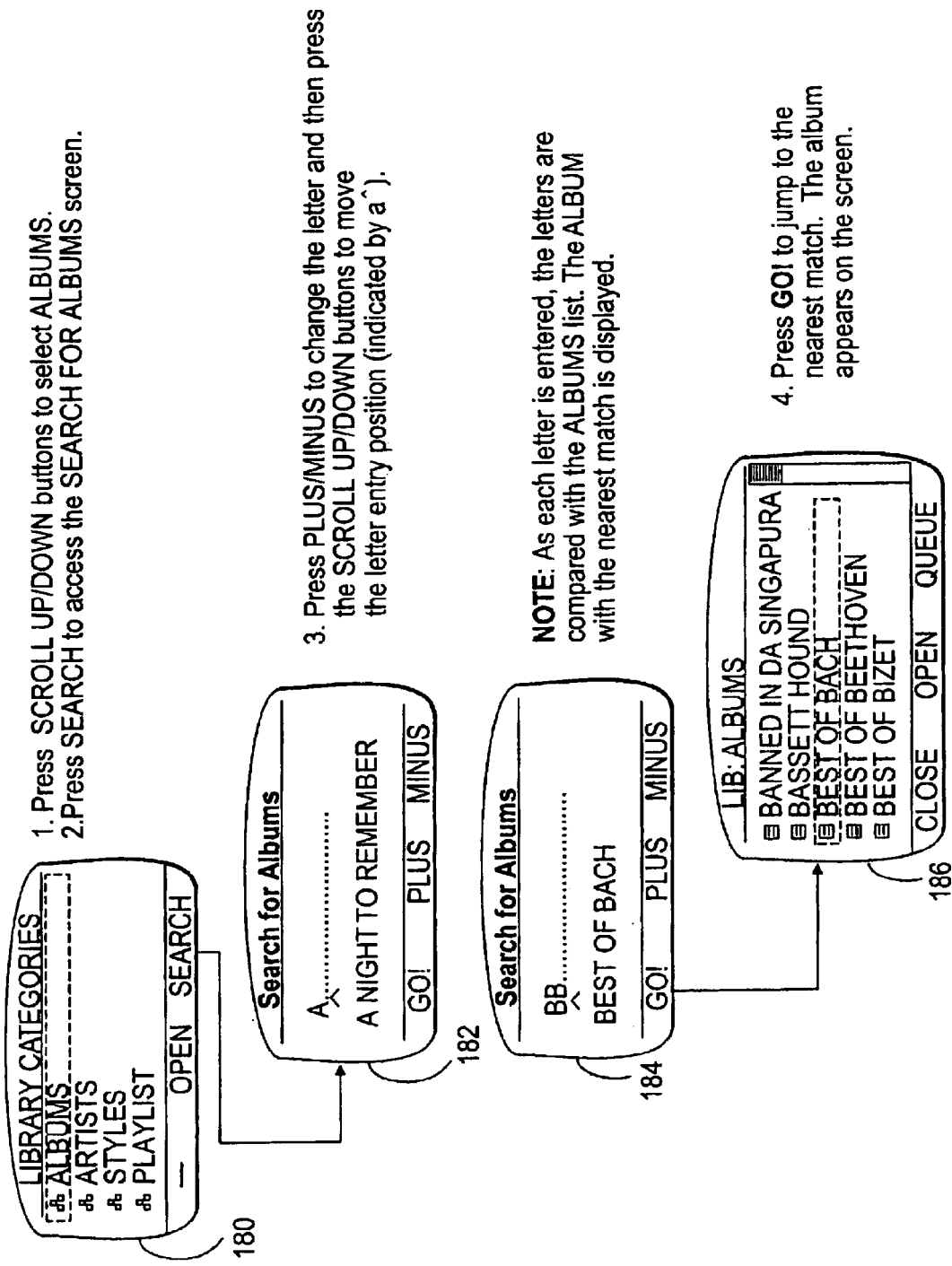
FIG. 12 shows display screens used to search for a song or other item.

FIG. 12 illustrates display screens used to search for a song or other item.

In FIG. 12, screen 180 is the initial library screen, as discussed above. If the user invokes the Search command (via the appropriate soft button) with Albums selected then screen 182 is displayed. Note that the search function can be applied to any of the categories. The user can depress the Plus or Minus soft buttons to cycle through the alphabet and change the character in the current location as indicated by the cursor. The cursor position is changed by using the scroll up/scroll down buttons 128 and 130, respectively, of FIG. 9. As each letter is entered the letters are compared and the nearest match of the stored albums' names is displayed as shown in screen 184. When the desired match is displayed the user selects the Go! command. Screen 186 shows the result of selecting the Go! command. A list of albums is displayed with the matched album centered and selected. The user can close, open or queue the album as discussed above.

FIG. 13 illustrates details of different items.

In FIG. 13, screen 200 illustrates details displayed as a result of selecting the "Details" command from soft button 1A track is selected. Screen 200 shows that details of the track "JukeBox Demo" shows the name of the album that the track resides on, the creator, or copyright owner, of the track, and the playing time of the track.

Screen 202 illustrates details of an item on the active queue list. Items are placed onto the active queue list be selecting the "Queue" command when an album, song, track, or other item is selected, as discussed above. For example, screen 204 shows the active queuelist where the track "JukeBox Demo" is selected. By invoking the "Details" command screen 202 is brought up to show details of the Jukebox Demo track.

As shown in screen 202, the Detail screen shows what track number the selected track is, which album the track is from; the creator, or copyright owner, of the track, and the title of the track. Additionally, the details for an item on the queue list also show playback settings. These are shown by two-letter abbreviations at the bottom of the screen. The settings are as shown in Table I, below.

TABLE I

| | |
|---|---|
| EA | Environmental Preset |
| EQ | Parametric EQ |
| HS | Headphone Spatialization |
| TS | Time Scaling |

TABLE I-continued

| | |
|---|---|
| 4S | Four Channel Speaker Sound (only if speakers are connected) |

These settings have their common meanings, as is known in the art. Note that the setting 4S is not shown in screen 202 as it is not currently active.

Figure 14:
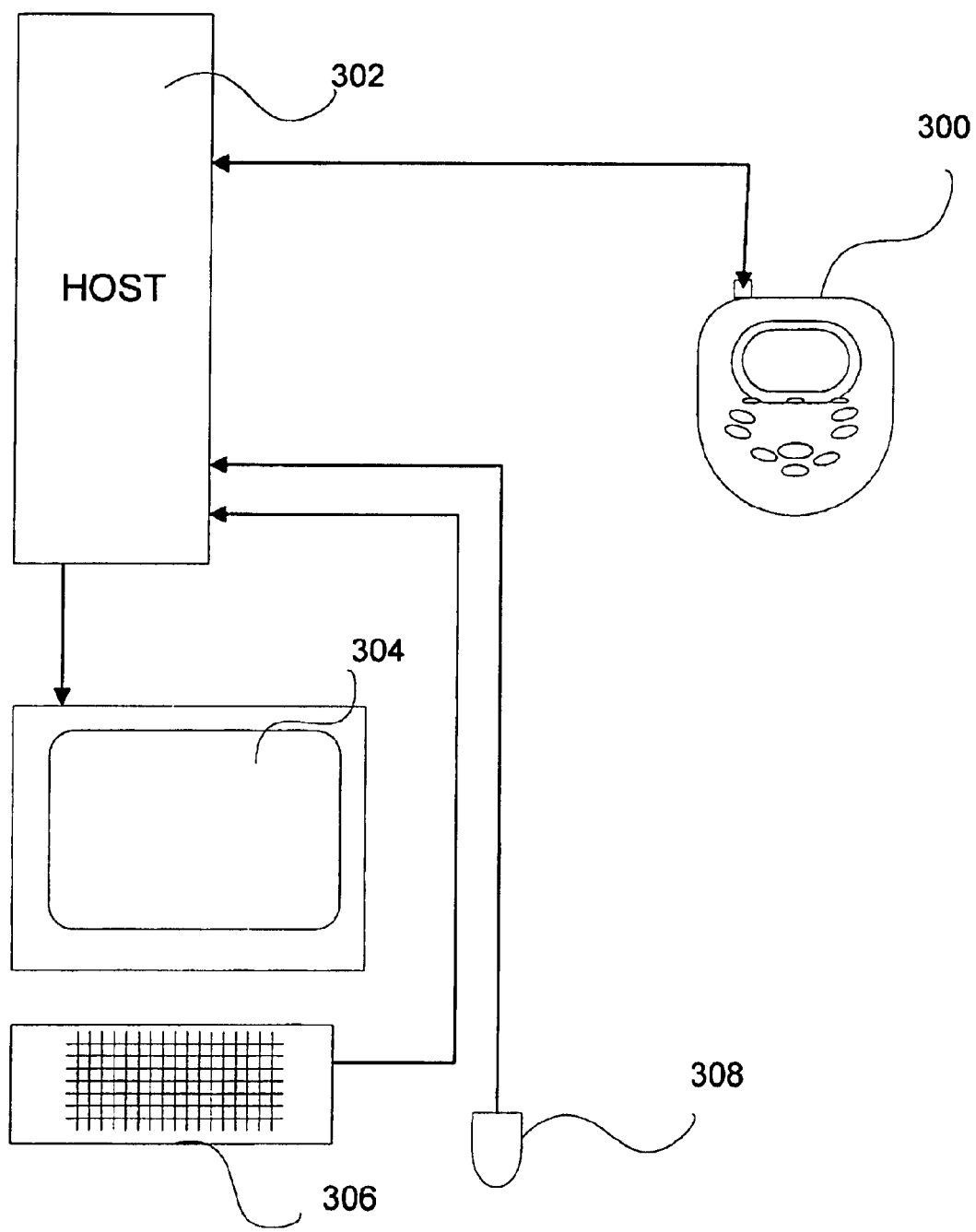
FIG. 14 illustrates a playback device coupled to a host computer system.

FIG. 14 illustrates the Nomad Jukebox coupled to a host computer system.

In FIG. 14, device 300 (e.g., the Nomad Jukebox) is coupled to host system 302. In a preferred embodiment host system 302 is a personal computer, such as an IBM-PC compatible computer. Host sytem 302 includes a user interface having display 304 and user input devices such as keyboard 306 and mouse 308. In other embodiments the host system need not be a full computer system. Any type of processing system having a user interface is possible. For example, it is possible to couple the device to a laptop computer, game console, web-enabled television, or any consumer electronic device or digital platform, in general. The host user interface need not provide a display and can be much more minimal than the keyboard and mouse shown in FIG. 14. A preferred embodiment of the invention uses a Universal Synchronous Bus (USB) connection but any type of connection such as IEEE 1394 (FireWire), Ethernet, Serial Port, etc. can be used. A wireless (i.e., optical or radio frequency) connection can be used.

Once device 300 is coupled to host system 302, a user of host system 302 can launch a bridge interface to allow for the transfer of files between device 300 and host system 302. In a preferred embodiment, once the bridge interface is launched, the controls of device 300 are inoperable. The user interface of host sytem 302 is used to operate the bridge interface to transfer files.

The invention has now been described with reference to the preferred embodiments. Alternatives and substitutions will now be apparent to persons of skill in the art.

What is claimed is:

1. A method of selecting at least one track from a plurality of tracks stored in a computer-readable medium of a portable media player configured to present sequentially a first, second, and third display screen on the display of the media player, the plurality of tracks accessed according to a hierarchy, the hierarchy having a plurality of categories, subcategories, and items respectively in a first, second, and third level of the hierarchy, the method comprising:
   selecting a category in the first display screen of the portable media player;
   displaying the subcategories belonging to the selected category in a listing presented in the second display screen;
   selecting a subcategory in the second display screen;
   displaying the items belonging to the selected subcategory in a listing presented in the third display screen; and
   accessing at least one track based on a selection made in one of the display screens.

2. The method of selecting a track as recited in claim 1 wherein the accessing at least one track comprises selecting a subcategory in the second display screen and playing a plurality of tracks associated with the selected subcategory.

3. The method of selecting a track as recited in claim 1 wherein the accessing at least one track comprises selecting a subcategory and adding the tracks associated with the selected subcategory to a playlist.

4. The method of selecting a track as recited in claim 1 wherein the accessing at least one track comprises selecting an item in the third display screen and playing at least one track associated with the selected item.

5. The method of selecting a track as recited in claim 1 wherein the accessing at least one track comprises selecting an item in the third display screen and adding at least one track associated with the selected item to a playlist.

6. The method of selecting a track as recited in claim 1 wherein the accessing at least one track comprises one of playing or adding to a playlist at least one track associated with a selected one of the category, subcategory, and item.

7. The method of selecting a track as recited in claim 1 wherein the accessing at least one track is made after the presentation of the third display screen by reverting back to one of the second and first display screens, the second display screen presented sequentially after the third display screen.

8. The method of selecting a track as recited in claim 1 further comprising selecting one of the items displayed in the third display screen and presenting a listing of items associated with the selected item in a fourth sequentially presented display screen.

9. The method of selecting a track as recited in claim 1 wherein the category genre is selected in the first display screen from available categories that include at least artist, album, and genre; and the subcategories listed in the second display screen comprise a listing of at least one genre type and one of the at least one genre type is selected.

10. The method of selecting a track as recited in claim 9 further comprising displaying in the third display screen at least one album associated with the selected genre type and selecting one of the at least one albums displayed in the third display screen and presenting a listing of tracks associated with the selected album in a fourth sequentially presented display screen.

11. The method of selecting a track as recited in claim 1 wherein the category artist is selected in the first display screen from available categories that include at least artist, album, and genre; the subcategories listed in the second display screen comprise a listing of names of artists and a first artist name is selected; and the items displayed in the third display screen comprises at least one album associated with the first artist name.

12. The method of selecting a track as recited in claim 1 wherein the track is a music track, accessing at least one track comprises accessing a track title in the third display screen, and the track is played in response to the access.

13. The method of selecting a track as recited in claim 1 wherein receipt of the selection in the first display screen results in an automatic transition of the first display screen into the second display screen and receipt of the selection in the second display screen results in an automatic transition of the second display screen into the third display screen.

14. The method of selecting a track as recited in claim 1 wherein the category selected in the first display screen is from a top level of the hierarchy.

15. The method of selecting a track as recited in claim 1 wherein the category selected in the first display screen is a category from a level at least one level below the top level of the hierarchy.

16. The method of selecting a track as recited in claim 1 wherein the plurality of categories comprise a list of artist names, the plurality of subcategories comprise a list of album names and the plurality of items comprise a list of track names.

* * * * *

UNITED STATES PATENT AND TRADEMARK OFFICE
Certificate

Patent No. 6,928,433 B2                                                                  Patented: August 9, 2005

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Ron Goodman, Santa Cruz, CA (US); Howard N. Egan, Capitola, CA (US); and David Bristow, Bainbridge Island, WA (US).

Signed and Sealed this Sixteenth Day of May 2006.

CHARLES RONES
*Supervisory Patent Examiner*
Art Unit 2164

(12) INTER PARTES REEXAMINATION CERTIFICATE (469th)
United States Patent
Goodman et al.

(10) Number: US 6,928,433 C1
(45) Certificate Issued: Oct. 8, 2012

(54) AUTOMATIC HIERARCHICAL CATEGORIZATION OF MUSIC BY METADATA

(75) Inventors: Ron Goodman, Santa Cruz, CA (US); Howard N. Egan, Capitola, CA (US)

(73) Assignee: Creative Technology Limited, Singapore (SG)

Reexamination Request:
No. 95/001,274, Dec. 1, 2009

Reexamination Certificate for:
Patent No.: 6,928,433
Issued: Aug. 9, 2005
Appl. No.: 09/755,723
Filed: Jan. 5, 2001

Certificate of Correction issued May 16, 2006.

(51) Int. Cl.
*G11B 27/11* (2006.01)
*G11B 27/10* (2006.01)
*G11B 27/34* (2006.01)
*G06F 17/30* (2006.01)

(52) U.S. Cl. .......... 386/243; 707/999.003; 707/999.004; 707/999.102; G9B/27.019; G9B/27.021; G9B/27.051

(58) Field of Classification Search ................... 707/104
See application file for complete search history.

(56) References Cited

To view the complete listing of prior art documents cited during the proceeding for Reexamination Control Number 95/001,274, please refer to the USPTO's public Patent Application Information Retrieval (PAIR) system under the Display References tab.

*Primary Examiner* — Mary Steelman

(57) ABSTRACT

A method, performed by software executing on the processor of a portable music playback device, that automatically files tracks according to hierarchical structure of categories to organize tracks in a logical order. A user interface is utilized to change the hierarchy, view track names, and select tracks for playback or other operations.

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 2, 3, 5 and 7 is confirmed.

Claims 1, 4, 6 and 8-16 are cancelled.

New claims 17-28 are added and determined to be patentable.

17. *The method of selecting a track as recited in claim 3 wherein the playlist is an active queue list of songs that is currently being played.*

18. *The method of selecting a track as recited in claim 5 wherein the playlist is an active queue list of songs that is currently being played.*

19. *The method of selecting a track as recited in claim 5 wherein the selected item in the third display screen is associated with a plurality of tracks, and wherein the accessing at least one track comprises adding the plurality of tracks associated with the selected item to a playlist.*

20. *The method of selecting a track as recited in claim 19 wherein the playlist is an active queue list of songs that is currently being played.*

21. *The method of selecting a track as recited in claim 5 wherein the selected item in the third display screen is a selected album name, and wherein the accessing at least one track comprises adding the plurality of tracks associated with the selected album name to a playlist.*

22. *The method of selecting a track as recited in claim 21 wherein the playlist is an active queue list of songs that is currently being played.*

23. *The method of selecting a track as recited in claim 1 wherein:*
    *the category album is selected in the first display screen from available categories that include at least artist and album;*
    *the subcategories listed in the second display screen comprise a listing of album names and one of the album names is selected; and*
    *the accessing at least one track comprises adding a plurality of tracks associated with the selected album name to a playlist.*

24. *The method of selecting a track as recited in claim 23 wherein the playlist is an active queue list of songs that is currently being played.*

25. *The method of selecting a track as recited in claim 1 wherein:*
    *the category genre is selected in the first display screen from available categories that include at least artist, album, and genre;*
    *the subcategories listed in the second display screen comprise a listing of a plurality of genre types, and one of one genre types is selected;*
    *the items displayed in the third display screen comprise a listing of a plurality of album names associated with the selected genre type, and one of the album names is selected; and*
    *the accessing at least one track comprises adding a plurality of tracks associated with the selected album name to a playlist.*

26. *The method of selecting a track as recited in claim 25 wherein the playlist is an active queue list of songs that is currently being played.*

27. *The method of selecting a track as recited in claim 1 wherein:*
    *the category artist is selected in the first display screen from available categories that include at least artist, album, and genre;*
    *the subcategories listed in the second display screen comprise a listing of artist names, and one of the listed artist names is selected;*
    *the items displayed in the third display screen comprise a listing of album names associated with the selected artist name, and one of the listed album names is selected; and*
    *the accessing at least one track comprises adding a plurality of tracks associated with the selected album name to a playlist.*

28. *The method of selecting a track as recited in claim 27 wherein the playlist is an active queue list of songs that is currently being played.*

\* \* \* \* \*